US012055061B2

(12) United States Patent
Lemonnier et al.

(10) Patent No.: US 12,055,061 B2
(45) Date of Patent: Aug. 6, 2024

(54) TURBINE RING ASSEMBLY MOUNTED ON A CROSS-MEMBER

(71) Applicant: SAFRAN AIRCRAFT ENGINES, Paris (FR)

(72) Inventors: Jérôme Claude George Lemonnier, Moissy-Cramayel (FR); Franck Davy Boisnault, Moissy-Cramayel (FR); Florian Armand Gabriel Gaudry, Moissy-Cramayel (FR); Kévin Claude Luc Baudy, Moissy-Cramayel (FR); Marion France Chambre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/555,801

(22) PCT Filed: Apr. 12, 2022

(86) PCT No.: PCT/FR2022/050688
§ 371 (c)(1),
(2) Date: Oct. 17, 2023

(87) PCT Pub. No.: WO2022/223905
PCT Pub. Date: Oct. 27, 2022

(65) Prior Publication Data
US 2024/0093619 A1    Mar. 21, 2024

(30) Foreign Application Priority Data

Apr. 21, 2021  (FR) ...................... 2104149

(51) Int. Cl.
*F01D 25/24*  (2006.01)
*F01D 11/12*  (2006.01)

(52) U.S. Cl.
CPC ............ *F01D 25/246* (2013.01); *F01D 11/12* (2013.01); *F05D 2230/642* (2013.01); *F05D 2240/11* (2013.01); *F05D 2300/6033* (2013.01)

(58) Field of Classification Search
CPC ..... F01D 25/246; F01D 11/12; F05D 2240/11
See application file for complete search history.

(56) References Cited

U.S. PATENT DOCUMENTS

| 10,301,960 B2 * | 5/2019 | Stapleton .............. F01D 25/246 |
| 11,215,081 B2 * | 1/2022 | Schilling .............. F01D 25/246 |

(Continued)

FOREIGN PATENT DOCUMENTS

| EP | 1350927 A2 | 10/2003 |
| EP | 3045783 A1 | 7/2016 |

(Continued)

OTHER PUBLICATIONS

Search Report and Written Opinion Issued in International Application No. PCT/FR2022/050688, issued Jun. 17, 2022.

(Continued)

*Primary Examiner* — Sabbir Hasan
(74) *Attorney, Agent, or Firm* — Bookoff McAndrews, PLLC

(57) ABSTRACT

A turbine ring assembly extending around an axis, including a plurality of ring sectors made of ceramic matrix composite material forming a turbine ring and a ring support structure held by a turbine casing, each ring sector including a base from which an upstream tab and a downstream tab extend radially outward, spaced axially from one another,
wherein the assembly also includes a cross-member mechanically connected to the ring support and including a first radial flange bearing against the upstream latching tabs of the ring sectors, and, for each ring sector, at least two transverse pins and a radial spring, (Continued)

each transverse pin passing through the upstream latching tab and the downstream latching tab of the ring sector and the ring support to hold the ring sector and the ring support secured to one another.

11 Claims, 3 Drawing Sheets

(56) References Cited

U.S. PATENT DOCUMENTS

| | | |
|---|---|---|
| 2006/0292001 A1 | 12/2006 | Keller et al. |
| 2012/0082540 A1 | 4/2012 | Dziech et al. |
| 2014/0271145 A1 | 9/2014 | Thomas et al. |

FOREIGN PATENT DOCUMENTS

| | | |
|---|---|---|
| EP | 3118417 A1 | 1/2017 |
| EP | 3680455 A1 | 7/2020 |
| FR | 2540939 A1 | 8/1984 |
| FR | 2955898 A1 | 8/2011 |
| GB | 2480766 A | 11/2011 |
| WO | 2015191174 A1 | 12/2015 |
| WO | 2015191186 A1 | 12/2015 |

OTHER PUBLICATIONS

Search Report issued in French Application No. 2104149, issued Sep. 22, 2021.

\* cited by examiner

[Fig. 1]
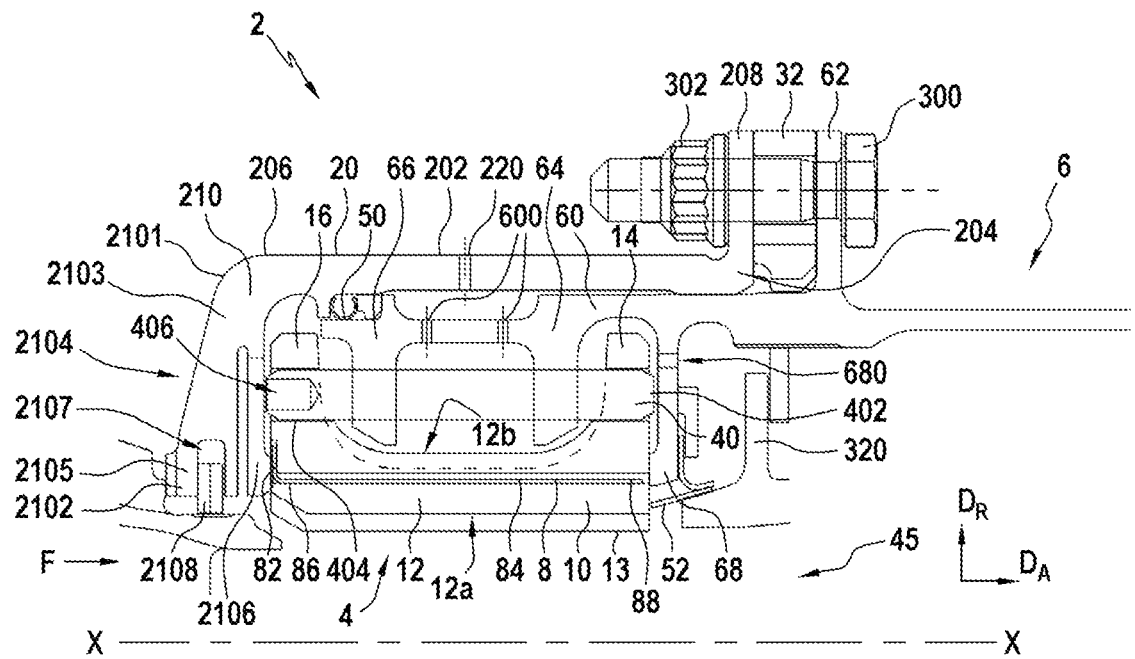
[Fig. 2]
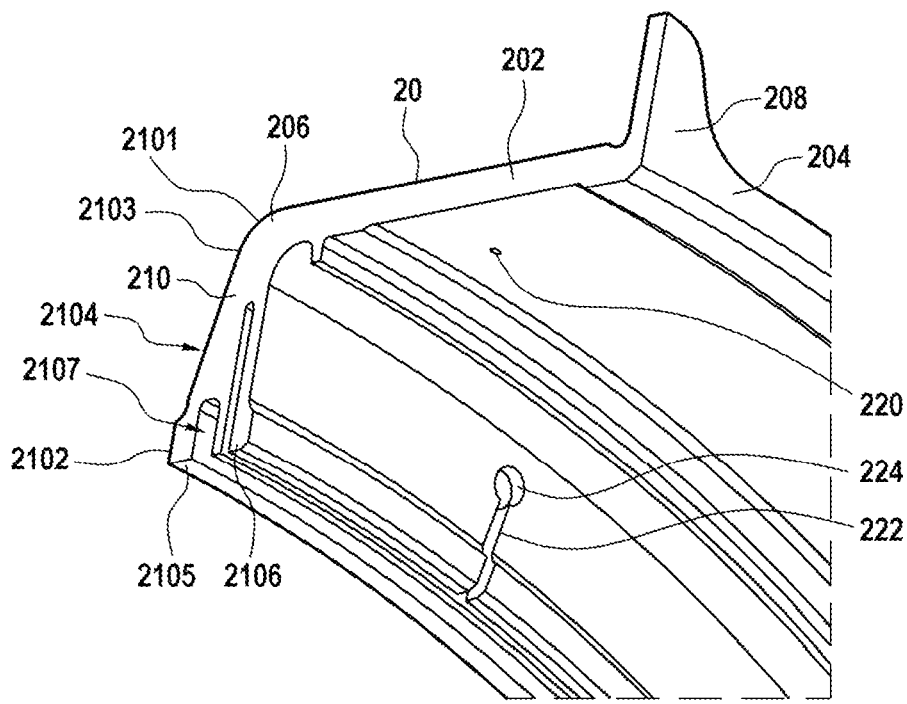

[Fig. 3]
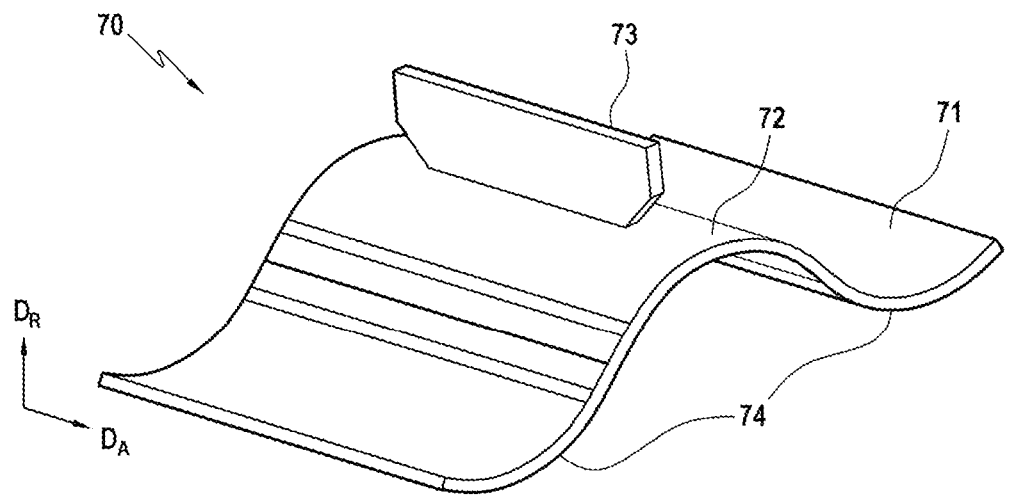
[Fig. 4]
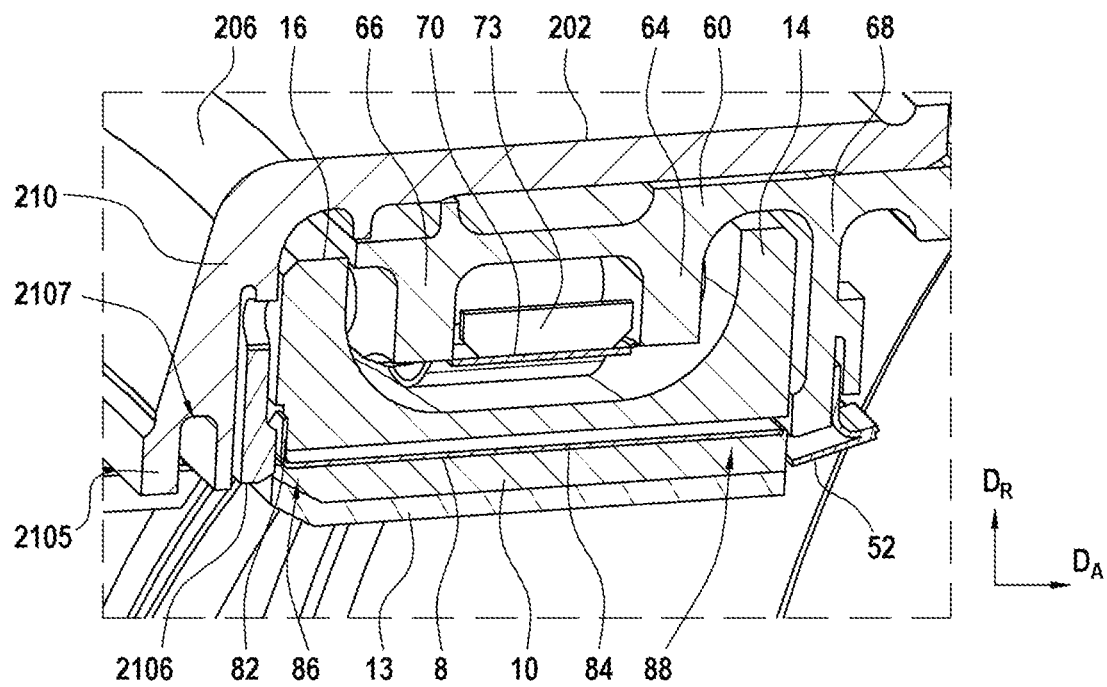

[Fig. 5]
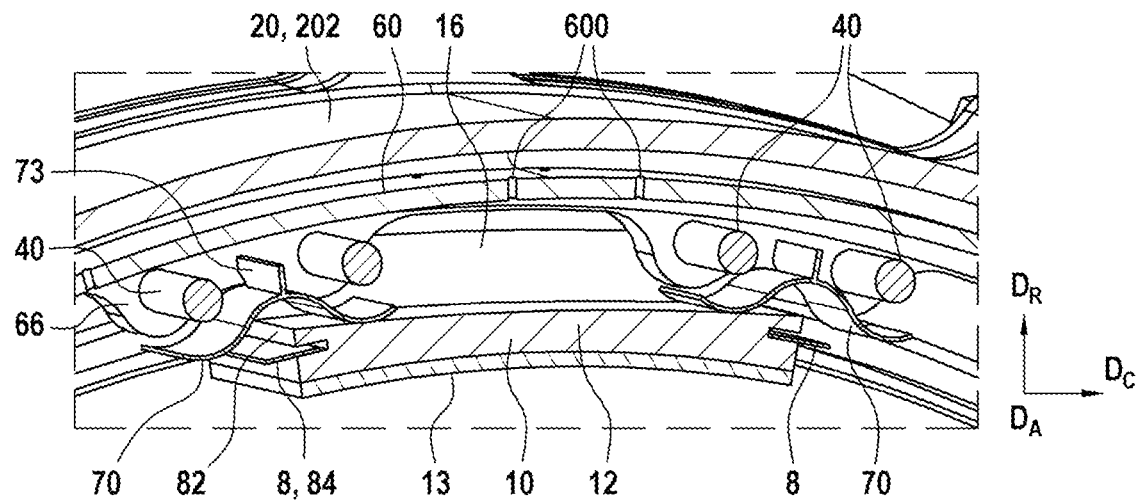

TURBINE RING ASSEMBLY MOUNTED ON A CROSS-MEMBER

CROSS-REFERENCE TO RELATED APPLICATIONS

This is a National Stage Application under 35 U.S.C. § 371 of International Application No. PCT/FR2022/050688, filed Apr. 12, 2022, now published as WO 2022/223905 A1, which claims priority to France Patent Application No. 2104149, filed on Apr. 21, 2021.

TECHNICAL FIELD

The invention relates to a turbine ring assembly for a turbomachine in which the assembly comprises a plurality of angular ring sectors made of ceramic matrix composite material set end to end to form a turbine ring.

The field of application of the invention is in particular that of aeronautical gas turbine engines. The invention is applicable, however, to other turbomachines, for example industrial turbines.

PRIOR ART

In the case of entirely metallic turbine ring assemblies, it is necessary to cool all the elements of the assembly and in particular the turbine ring which is subjected to the hottest flows. This cooling has a significant impact on the performance of the engine because the cooling flow used is extracted from the main flow of the engine. In addition, the use of metal for the turbine ring limits the possibilities for increasing the temperature at the turbine, which would however allow improving the performance of aeronautical engines.

In order to attempt to solve these problems, producing turbine ring sectors made of ceramic matrix composite (CMC) material has been considered, in order to dispense with the implementation of a metallic material.

CMC materials have good mechanical properties, making them able to constitute structural elements and advantageously retain these mechanical properties at high temperatures. The implementation of CMC material has advantageously allowed reducing the cooling flow to be imposed during operation and thus increasing the performance of turbomachines. In addition, the implementation of CMC material advantageously allows reducing the mass of the turbomachines and reducing the effect of thermal dilation encountered with metal parts.

Moreover, documents FR 2 540 939, GB 2 480 766, EP 1 350 927, US 2014/0271145, US 2012/082540 and FR 2 955 898 are known, which disclose turbine ring assemblies.

The ring sectors include an annular base, the inner face of which defines the inner face of the turbine ring, and an outer face from which extend radially two tabs, the ends of which are held between the two flanges of a metal ring support structure.

The use of CMC ring sectors thus allows a significant reduction in the ventilation necessary for the cooling of the turbine ring. However, CMC having a different mechanical behavior from a metallic material, its integration, as well as the manner of positioning it within the turbine have needed to be re-thought. In fact, CMC does not tolerate shrink-fit assemblies (usually employed for metal rings) and its thermal dilation is smaller than that of a metallic material.

In addition, the use of CMC ring sectors increases the number of parts necessary for its integration into the turbine casing, which increases the cost and the weight of the assembly and necessitates complex assembly procedures (sleeve shrinking, dowel assembly, etc.).

DISCLOSURE OF THE INVENTION

The present invention thus has as its main object to propose a turbine ring assembly which does not have the aforementioned disadvantages while still having a reduced mass, and further reducing the intensity of the mechanical stresses to which the CMC ring sectors are subjected during the operation of the turbine.

This object is achieved due to a turbine ring assembly extending around an axis, the assembly comprising a plurality of ring sectors made of ceramic matrix composite material forming a turbine ring and a ring support structure held by a turbine casing. Each ring sector comprises a base from which an upstream latching tab and a downstream latching tab, spaced axially from one another, extend radially outward.

The turbine ring assembly according to the invention is notable in particular in that it also comprises a cross-member mechanically connected to the ring support and including a first radial flange bearing against the upstream latching tabs of the ring sectors and, for each ring sector, at least two transverse pins and a radial spring, each transverse pin passing through the upstream latching tab and the downstream latching tab of the ring sector and the ring support to hold the ring sector and the ring support secured to one another, and the radial spring being held bearing against the ring sector on the one hand and against the ring support on the other hand, the ring support also comprising a second radial flange bearing against the downstream latching tabs of the ring sectors, the upstream latching tab and the downstream latching tab of each ring sector being arranged axially between the first radial flange and the second radial flange.

The architecture of the turbine ring assembly according to the invention thus allows offering radial and axial retention of each ring sector made of CMC material without using the retention techniques for metal rings, and acts in such a way as to control its position and avoid having it vibrate, on the one hand, while still allowing the ring sector, and by extension the ring, to freely deform under the influence of temperature increases and of pressure variations, this in particular due to the reduced number of interfacing metal parts.

In this architecture, the radial retention of a ring made of CMC material is provided, on the one hand, by said at least two pins passing through each ring sector and the ring support by means of axial holes provided for this purpose and, on the other hand, by means of the metal spring placed between two pins and being supported radially between the ring sector and the ring support.

The spring allows in particular holding the ring sectors arranged at the same radial position.

The axial retention of a ring made of CMC material is provided, on the one hand, by the securing of the ring support to the cross-member, for example via at least one assembly formed from a screw and a nut, attaching the ring support and the cross-member together outside the casing and, on the other hand, by the flat contact between the upstream latching tab of the ring and the cross-member and by the flat contact between the ring support and the downstream latching tab of the ring.

In addition, this architectural configuration of the turbine ring assembly offers a solution with no bolted connection between the turbine ring and the ring support structure and the casing, the connection being accomplished due to the transverse pins which allows considerably reducing the total mass of the assembly. In addition, the elimination of the bolted connections also allows arranging differently the parts of the ring assembly, which also allows an improvement in mass by a reduction in the number of elements constituting the turbine ring assembly.

In addition, the elimination of radial pins reduces the machining operations of the parts of the ring support structure. The result is an improvement in parts count, and therefore a reduction of the weight and of the cost of the assembly.

According to a first aspect of the turbine ring assembly, said first radial flange can comprise a first portion and a second portion radially inside of the first portion, the second portion including a first tab and a second tab axially distant from one another and both secured to the first portion, the first tab being axially upstream of the second tab, and the second tab bearing against the upstream latching tab.

The first radial flange of the cross-member thus allows minimizing tangential stress in the metal parts providing the retention of the ring, on the one hand, and compensating the strong manufacturing dispersion of the CMC ring sectors, particularly the axial length of the rings.

In addition, the production of the cross-member as a single piece allows significantly reducing the number of parts necessary for the retention of the ring.

Moreover, manufacturing tolerances are less severe, the cross-member allowing taking-up the gaps between the ring sectors, which a 360° flange cannot do.

According to a second aspect of the turbine ring assembly, the downstream tab of said first radial flange can comprise a first end which is secured to the first portion of the first radial flange and a second end which is free and opposite to the first end, the downstream tab also comprising radial slots regularly spaced angularly and each extending from the second end to a circular opening, the number of radial slots being at most equal to the number of ring sectors.

The circular openings into which the slots lead allow reducing the stress concentration in the area. In one embodiment, the number of slots can be equal to the number of ring sectors. In this manner, the contact between the cross-member and each ring sector of the assembly is ensured regardless of the manufacturing dispersion of the ring sectors made of CMC. In another embodiment, the ring sectors can be grouped two by two or three by three in order to create groups of two or three rings having substantially identical axial lengths. The groups of ring sectors are then mounted side by side on the engine to form the ring.

In this manner, the number of slots necessary for the downstream tab of the first radial flange of the cross-member can be divided by two or three. This reduction in the number of slots allows a further increase in the robustness of the ventilation of the device while improving the sealing between the out-of-stream sector and the stream sector, particularly the sealing of the cavity located at the radially upper part of the ring.

According to a third aspect of the turbine ring assembly, the cross-member can comprise a bell housing arranged around the turbine ring, and the ring support can comprise a shroud arranged radially between the turbine ring and the bell housing of the cross-member.

According to a fourth aspect of the turbine ring assembly, the bell housing of the cross-member can comprise injection openings and the shroud of the ring support comprise complementary injection openings radially offset relative to the injection openings. In other words, no complementary injection opening of the ring support is aligned radially with an injection opening of the cross-member.

The injection openings and the complementary injection openings supply cold air at an elevated pressure, generally air extracted at the outlet of the high-pressure compressor, allowing pressurizing the cavities located between the ring and the cross-member or in the ring and the ring support. In other words, this injection of air allows pressurizing the out-of-stream sector and thus improving the sealing between the out-of-stream sector and the stream sector.

According to a fifth aspect of the turbine ring, the assembly can also comprise a C-shaped annular seal extending between the bell housing of the cross-member and the shroud of the ring support, the C-shaped annular seal being coaxial with the bell housing of the cross-member and the shroud of the ring support.

The C-shaped seal placed between the cross-member and the ring support allows minimizing any leakage between these two parts and improving the robustness of the device for cooling the rings.

According to a sixth aspect of the turbine ring assembly, the ring support structure can also comprise a first radial support flange and a second radial support flange axially distant from the first radial support flange, each transverse pin passing through the first radial support flange and the second radial support flange.

The radial coupling of the turbine ring sectors to the rings support via transverse pins allows avoiding using bolted connections, which are bulkier and heavier, and simplifying the mechanical configuration of the ring assembly.

According to a seventh aspect of the turbine ring assembly, the radial spring can comprise a metal plate having at least one camber in a first direction parallel to the axial direction.

The metal plate forming the radial spring can be corrugated or cambered, the bump extending radially to exert a force in the radial direction of the turbine ring.

According to an eighth aspect of the turbine ring assembly, the radial spring also comprises a tab protruding from the peak of the camber in a second direction, orthogonal to the first direction and extending along the camber in a third direction orthogonal to the first and second directions over a length less than the length of the metal plate in the third direction, the tab being arranged between the first and second radial support flanges to form an axial abutment of the spring.

The tab of the spring thus prevents the spring from moving axially.

According to a ninth aspect of the turbine ring assembly, the assembly can also comprise an L-shaped sealing tab arranged at each junction between two adjacent ring sectors, each sealing tab comprising a large portion extending axially and a small portion extending radially, the small portion being secured to the large portion at an upstream end of the large portion.

The tab extending in the circumferential direction between two adjacent ring sectors over the entire axial length of the ring sectors, it forms a seal providing sealing between the stream sector and the out-of-stream sector. In addition, the L shape of the tab allows avoiding any impact between the tab and the second radial flange.

According to a tenth aspect of the turbine ring assembly, the assembly can also comprise a thermal protection ring mounted radially inside of the second radial flange, the second radial flange of the ring support also comprising discharge holes passing axially through said second radial flange of the ring support.

The discharge holes and the thermal protection ring allow providing a seal between the out-of-stream sector and the stream sector, particularly in cavities located downstream of the ring sectors. The thermal protection ring can be an annular sheet-metal part segmented at a single place in its circumference to better adapt to the radial dimensions.

The invention also has as its object a turbomachine comprising an assembly as previously defined.

BRIEF DESCRIPTION OF THE DRAWINGS

FIG. 1 is a schematic section view in a plane comprising the axial direction and the radial direction of a turbine ring assembly according to the invention.

FIG. 2 shows a schematic perspective section view of the cross-member of the turbine assembly of FIG. 1.

FIG. 3 shows a schematic perspective view of the radial spring of the turbine assembly of FIG. 1.

FIG. 4 shows a section view of the ring assembly at a radial spring in a section plane comprising the axial direction and the radial direction.

FIG. 5 shows a section view of the ring assembly at a ring sector in a section plane comprising the radial direction and orthogonal to the axial direction.

DESCRIPTION OF THE EMBODIMENTS

FIG. 1 shows schematically a turbine ring assembly 2 according to the invention. FIG. 1 is a section view in a plane comprising the radial direction and the axial direction.

This assembly 2 comprises in particular a turbine ring 4 made of a ceramic matrix composite (CMC) material centered on a longitudinal axis X-X, a metal ring support structure 6 attached to a turbine casing of which only an attachment portion 32 is shown in FIG. 1 for greater legibility. The turbine ring 4 surrounds a set of turbine blades, not shown.

Hereafter in the entire text, the terms "upstream" and "downstream" are used with reference to the direction of the gas flow F through the blades indicated by an arrow.

Moreover, the turbine ring 4 is formed from a plurality of angular ring sectors 10 which are placed end to end in the circumferential direction to form a ring. In FIG. 1, the arrow $D_A$ indicates the axial direction of the turbine ring while the arrow $D_R$ indicates the radial direction of the turbine ring.

Each angular ring sector 10 has a cross-section substantially in the shape of an inverted Pi (or π) with a base 12 provided with an inner face 12a which defines an angular portion of the inner face of the turbine ring 4, and which is typically provided with an abradable coating layer 13 also serving as a thermal and environmental barrier.

Two latching tabs, a downstream latching tab 14 and an upstream latching tab 16, extend radially from the outer face 12b of the base 12 opposite to the inner face 12a. These latching tabs 14 and 16 extend over the entire width of each ring sector 10 (in the circumferential direction).

In addition to the turbine ring 4 and to the ring support structure 6 arranged radially outside the turbine ring 4, the ring assembly 2 also comprises a cross-member 20 attached to the ring support structure 6 by means of a bolt 300 and a nut 302.

The cross-member 20 comprises a bell housing 202 extending around the axis X-X and having a downstream end 204 and an upstream end 206. The cross-member 20 also comprises a first radial attachment flange 208 extending radially outward from the downstream end 204 of the cross-member 20.

The ring support structure 6 comprises a shroud 60 extending around the axis X-X and comprises a second attachment flange 62 extending radially outward from the shroud 60.

The second radial attachment flange 62 of the shroud 60 of the ring support structure 6, the attachment portion 32 of the turbine casing and the first radial attachment flange 208 of the cross-member 20 are attached together by means of the bolt 300 which passes axially through the three elements, and by the nut 302.

The ring support structure 6 also comprises a first radial latching flange 64 for the ring 4, and a second radial latching flange 66 for the ring 4, each extending inward in the radial direction $D_R$, i.e. toward the turbine ring 4.

The first radial latching flange 64 is placed downstream of the second radial latching flange 66. The first radial latching flange 64 and the second radial latching flange 66 are arranged axially between the downstream latching tab 14 and the upstream latching tab 16 of the ring sectors 10.

The turbine ring assembly 2 also comprises transverse pins 40, each transverse pin 40 being formed in a single piece and passing axially through, in the gas flow direction F, the upstream tab 16 of a ring sector 10, the second radial latching flange 66 of the ring support structure 6, the first radial latching flange 64 of the ring support structure 6, and the downstream latching tab 14.

Each transverse pin 40 comprises a downstream end 402, an upstream end 404, the upstream end comprising an axial opening 406 to facilitate the removal of the pin 40.

The cross-member 20 also comprises an upstream radial flange 210 extending radially inward from the upstream end 206 of the cross-member 20. The upstream radial flange 210 comprises, in the radial direction $D_R$, a first end 2101 secured to the upstream end 206 of the cross-member 20, a second, free end 2102 opposite to the first end 2101, a first portion 2103 and a second portion 2104, the first portion 2103 extending radially between the first end 2101 and the second portion 2104, and the second portion 2104 extending radially between the first portion 2103 and the second end 2102.

The second portion 2104 of the upstream radial flange 210 of the cross-member 20 comprises an upstream tab 2105 and a downstream tab 2106. The upstream tab 2105 and the downstream tab 2106 of the second portion 2104 of the upstream radial flange 210 form two rings distant from one another in the axial direction $D_A$. In addition, the downstream tab 2106 of the upstream radial flange 210 bears against the upstream latching tab 16 of the ring sectors 10.

The upstream latching tab 16 of the ring sectors 10 is thus arranged axially, in the flow direction F, between the downstream tab 2106 of the upstream radial flange 210 of the cross-member 20 and the second radial latching flange 66 of the ring support structure 6.

In addition, the upstream tab 2105 of the second portion 2104 of the upstream radial flange 210 comprises a radial groove 2107 on its radially inner end inside which is inserted a gasket 2108.

The cross-member 20 can be a cylindrical (i.e. 360°) part or be produced by assembling a plurality of cross-member sectors set end to end. The same is true of the ring support structure which can be made in a single cylindrical piece or by assembling flange sectors.

The ring support structure 6 also comprises a downstream radial flange 68 arranged axially downstream of the first latching flange 64 and downstream of the downstream latching tab 14 of the ring sectors 10. The downstream latching tab 14 of the ring sectors 10 is thus arranged axially, in the flow direction F, between the first radial latching flange 64 and the downstream radial flange 68 of the ring support structure 6. The downstream radial flange 68 bears against the downstream latching tab 16 of the ring sectors 10.

The ring sectors 10 are thus held axially supported between the downstream tab 2106 and the upstream radial flange 210 of the cross-member 20 and the downstream radial flange 68 of the ring support structure 6.

The bell housing 202 of the cross-member 20 also comprises injection openings 220 passing radially through the bell housing 202, and the shroud 60 of the ring support structure 6, also comprises complementary injection openings 600 passing radially through the shroud 60. The injection openings 200 and the complementary injection openings 600 are not aligned radially. They can be arranged in a staggered pattern relative to the others. The injection openings 200 and the complementary injection openings 600 allow directing cooling air extracted from the high-pressure compressor into the cavities located between the ring support structure 6 and the turbine ring 4 in particular.

The downstream radial flange 68 of the ring support structure 6 also comprises discharge holes 680 allowing directing cooling air into the cavity located downstream of the downstream radial flange 68.

The ring assembly 2 also comprises an annular C-shaped metal seal 50 arranged radially between the cross-member 20 and the ring support structure 6 to improve sealing.

The ring assembly 2 also comprises a thermal protection ring 52 made of metal arranged radially between the downstream radial flange 68 of the ring support structure 6 and the stream 45 inside which the gas flow F flows.

In addition, as illustrated in FIG. 2 which shows a schematic section view of the cross-member 20, the downstream tab 2106 of the upstream radial flange 210 of the cross-member 20 also comprises a plurality of radial slots 222 regularly spaced angularly in the circumferential direction. The radial slots 222 are open and extend radially from the second end 2102 of the upstream radial flange 210 to a circular opening 224 allowing reducing the accumulation of the stresses. According to the embodiment, the number of radial slots 222 is equal to the number of ring sectors 10 forming the turbine ring 4, or is equal to the number of ring sectors 10 divided by two or three.

Shown schematically in perspective in FIG. 3 is a radial spring 70. The radial spring 70 comprises a corrugated metal plate 71, the corrugation being arranged in a first direction tangent to the circumferential direction of the turbine ring 4 when the radial spring 70 is mounted on the turbine ring assembly 2. The metal plate 71 thus comprises a central boss 72 from which protrude a tab 73 which also extends in a second direction orthogonal to the first direction and parallel to the axial direction $D_A$ when the radial spring 70 is mounted on the turbine ring assembly 2. The length of the tab in the axial direction $D_A$ is less than the length of the metal plate 71.

The central boss 72 is surrounded by two tabs 74 having a boss opposite to the central boss 72.

As illustrated in FIG. 4 which shows a section view in a plane comprising the axial direction $D_A$ and the radial direction $D_R$ at a radial spring 70, the tab 73 is axially arranged and held against the first radial latching flange 64 and the second radial latching flange 66. Radially, the radial spring 70 bears, via its tabs 74, against the base 12 of the ring sector 10 in which it is mounted and against the shroud 60 of the ring support structure 6 via its tab 73.

As illustrated in FIGS. 1 and 4, and in FIG. 5 which shows a section view of the turbine ring assembly 2 at a ring sector 10 in a section plane comprising the radial direction $D_R$ and the circumferential direction $D_C$ which is orthogonal to the radial direction $D_R$ and to the axial direction $D_A$, the ring assembly also comprises a sealing tab 8 having an L shape with a small portion 82 and a large portion 84.

The large portion extends in the axial direction $D_A$ between an upstream end 86 and a downstream end 88. The small portion 82 extends radially outward from the upstream end 86 of the large portion 84.

The sealing tab 8 is arranged at each junction between two ring sectors 10. The small portion 82 allows holding the sealing tab 8 axially in position and avoiding it moving downstream and damaging the downstream radial flange 68 of the ring support structure 6.

The present invention thus proposes a turbine ring assembly having a reduced number of parts, thus reducing the risk of leakage and improving the robustness of the ventilation and of the sealing of the assembly, while still ensuring the retention of the ring sectors made of CMC material. In addition, the turbine ring assembly according to the invention avoids the manufacturing dispersion of the ring sectors made of CMC and allow reducing the tangential stresses at the ring retaining devices. In addition, the turbine ring assembly is integrable over a greater range of turbines.

The invention claimed is:

1. A turbine ring assembly extending around an axis, comprising a plurality of ring sectors made of ceramic matrix composite material, forming a turbine ring and a ring support structure held by a turbine casing, each ring sector comprising a base from which an upstream latching tab and a downstream latching tab, spaced axially away from one another, extend radially outward,
wherein the turbine ring assembly additionally comprises:
a cross-member mechanically connected to the ring support structure and comprising a first radial flange bearing against the upstream latching tab of each ring sector, and
for each ring sector, at least two transverse pins and a radial spring, each of said at least two transverse pins passing though the upstream latching tab and the downstream latching tab of the ring sector and the ring support structure to hold the ring sector and the ring support structure secured to one another, and the radial spring being held bearing, in a radial direction orthogonal to the axial direction, against the ring sector on the one hand and against the ring support structure on the other hand to hold the ring sectors arranged at the same radial position,
the ring support structure also comprising a second radial flange bearing against the downstream latching tabs of the ring sectors, the upstream latching tab and the downstream latching tab of each ring sector being arranged axially between the first radial flange and the second radial flange, and said first radial flange comprising a first portion and a second portion radially inside the first portion, the second portion including a first tab and a second tab axially distant from one another and both secured to the first portion, the first tab being axially upstream of the second tab, and the second tab bearing against the upstream latching tab.

2. The turbine ring assembly according to claim 1, wherein the downstream tab of said first radial flange comprises a first end which is secured to the first portion of the first radial flange and a second end which is free and opposite to the first end, the downstream tab also comprising radial slots regularly spaced angularly and each extending from the second end to an opening, the number of radial slots being at most equal to the number of ring sectors.

3. The turbine ring assembly according to claim 1, wherein the cross-member comprises a bell housing arranged around the turbine ring, and the ring support structure comprises a shroud arranged radially between the turbine ring and the bell housing of the cross-member.

4. The turbine ring assembly according to claim 3, wherein the bell housing of the cross-member comprises injection openings and the shroud of the ring support structure comprise complementary injection openings axially offset relative to the injection openings.

5. The turbine ring assembly according to claim 3, also comprising a C-shaped annular seal extending between the bell housing of the cross-member and the shroud of the ring support structure, the C-shaped annular seal being coaxial with the bell housing of the cross-member and the shroud of the ring support structure.

6. The turbine ring assembly according to claim 1, wherein the ring support structure also comprises a first radial support flange and a second radial support flange axially distant from the first radial support flange, each of said at least two transvers pins passing through the first radial support flange and the second radial support flange.

7. The turbine ring assembly according to claim 1, wherein the radial spring comprises a metal plate corrugated so as to have at least one camber.

8. The turbine ring assembly according to claim 7, wherein the radial spring also comprises a tab protruding from the peak of the at least one camber and extending along the at least one camber over a length less than the axial length of the metal plate, the tab being arranged between the first and the second axial support flanges.

9. The turbine ring assembly according to claim 1, also comprising an L-shaped sealing tab arranged at each junction between two adjacent ring sectors of the plurality of ring sectors, each sealing tab comprising a large portion extending axially and a small portion extending radially, the small portion being secured to the large portion at an upstream end of the large portion.

10. The turbine ring assembly according claim 1, also comprising a thermal protection ring mounted radially inside of the second radial flange, the second radial flange also comprising discharge holes passing axially through said second radial flange.

11. A turbomachine comprising the turbine ring assembly according to claim 1.

* * * * *